(12) United States Patent
Leprovost et al.

(10) Patent No.: US 8,295,352 B2
(45) Date of Patent: Oct. 23, 2012

(54) PROCESS FOR DELIVERING A VIDEO STREAM OVER A WIRELESS BIDIRECTIONAL CHANNEL BETWEEN A VIDEO ENCODER AND A VIDEO DECODER

(75) Inventors: Yann Leprovost, Nozay (FR); Cedric Marin, Nozay (FR)

(73) Assignee: Alcatel Lucent, Paris (FR)

( * ) Notice: Subject to any disclaimer, the term of this patent is extended or adjusted under 35 U.S.C. 154(b) by 717 days.

(21) Appl. No.: 12/332,125

(22) Filed: Dec. 10, 2008

(65) Prior Publication Data
US 2009/0180542 A1 Jul. 16, 2009

(30) Foreign Application Priority Data
Dec. 11, 2007 (EP) .................................... 07291490

(51) Int. Cl.
*H04N 7/12* (2006.01)
(52) U.S. Cl. .......... 375/240.16; 375/240.01; 375/240.12
(58) Field of Classification Search ............... 375/240.1, 375/240.12, 240.16, 130–153; 704/500–504
See application file for complete search history.

(56) References Cited

U.S. PATENT DOCUMENTS

| | | | |
|---|---|---|---|
| 6,377,553 B1 | 4/2002 | Vary et al. | |
| 7,230,987 B2* | 6/2007 | Demas et al. | 375/240.28 |
| 7,873,224 B2* | 1/2011 | Jalil et al. | 382/232 |
| 2003/0163209 A1* | 8/2003 | Fukuhara et al. | 700/55 |
| 2005/0138532 A1 | 6/2005 | Park | |
| 2005/0163388 A1* | 7/2005 | Schwartz et al. | 382/232 |
| 2005/0175090 A1 | 8/2005 | Vetro et al. | |
| 2006/0062312 A1* | 3/2006 | Lee et al. | 375/240.27 |
| 2007/0036213 A1* | 2/2007 | Matsumura et al. | 375/240.03 |
| 2007/0147506 A1* | 6/2007 | Kwon et al. | 375/240.16 |
| 2008/0025397 A1* | 1/2008 | Zhao et al. | 375/240.13 |
| 2008/0101465 A1* | 5/2008 | Chono et al. | 375/240.03 |
| 2008/0253487 A1* | 10/2008 | Abrishamkar et al. | 375/346 |
| 2009/0323812 A1 | 12/2009 | Leprovost et al. | |

FOREIGN PATENT DOCUMENTS

EP 1 603 339 A1 12/2005
(Continued)

OTHER PUBLICATIONS

Jurca, D.; Frossard, P.; Media flow rate allocation in multipath networks; Oct. 2007; IEEE; Vol. 9, Issue:6; pp. 1230-1231.*

(Continued)

*Primary Examiner* — Christopher Brown
*Assistant Examiner* — Fahimeh Mohammadi
(74) *Attorney, Agent, or Firm* — Fay Sharpe LLP

(57) ABSTRACT

A process for delivering a video stream over a bidirectional wireless channel between a video encoder and a video decoder, is provided. The video frames of the video stream are encoded by determining predictions for defined partitions of the video frames, a prediction being based on at least one reference area of a reference frame of the video stream; one motion vector associated to said reference area; and a weighting factor associated to said reference area. The difference between partition and corresponding predicted partition is done to establish a partition residual, the encoded video stream with partition residual are transmitted to the video decoder to decode predicted partition, decoded partition of the video frame being formed by combination of decoded predicted partition and corresponding partition residual. A transmission error probability of the decoded partition is fed back to the video encoder.

20 Claims, 1 Drawing Sheet

FOREIGN PATENT DOCUMENTS

| WO | 9516315 | A1 | 6/1995 |
|---|---|---|---|
| WO | 2005094086 | A1 | 10/2005 |
| WO | 2006099223 | A2 | 9/2006 |
| WO | 2006122314 | A2 | 11/2006 |

OTHER PUBLICATIONS

Yang et al., "Rate-Distortion Optimized Motion Estimation for Error Resilient Video Coding," Acoustics, Speech, and Signal Processing, 2005, Proceedings, (ICASSP ' 05), IEEE International Conference on Philadelphia, Pennsylvania, USA, vol. 2, pp. 173-176. Mar. 2005.
Cote at al., "Optimal Mode Selection and Synchronization for Robust Video Communications Over Error-Prone Networks," IEEE Journal on Selected Areas in Communications, IEEE Service Center, vol. 18, No. 6, pp. 952-965. Jun. 2000.
European Search Report.
Hanzo et al., "Interactive Cellular and Cordless Video Telephony: State-of-the-Art System Design Principles and Expected Performance", Proceedings of the IEEE, vol. 88, No. 9, Sep. 2000, pp. 1388-1413.
Hagenaur et al., Sequential Decoding for Mobile Radio Receivers, Seminar Eurecom, Jun. 2005 (51 Pages).
Al-Mualla et al., Multiple-Reference Temporal Error Concealment, Proceedings of IEEE International Symposium on Circuits and Systems, Vol. 5, May 6, 2001, pp. 149-152.

\* cited by examiner

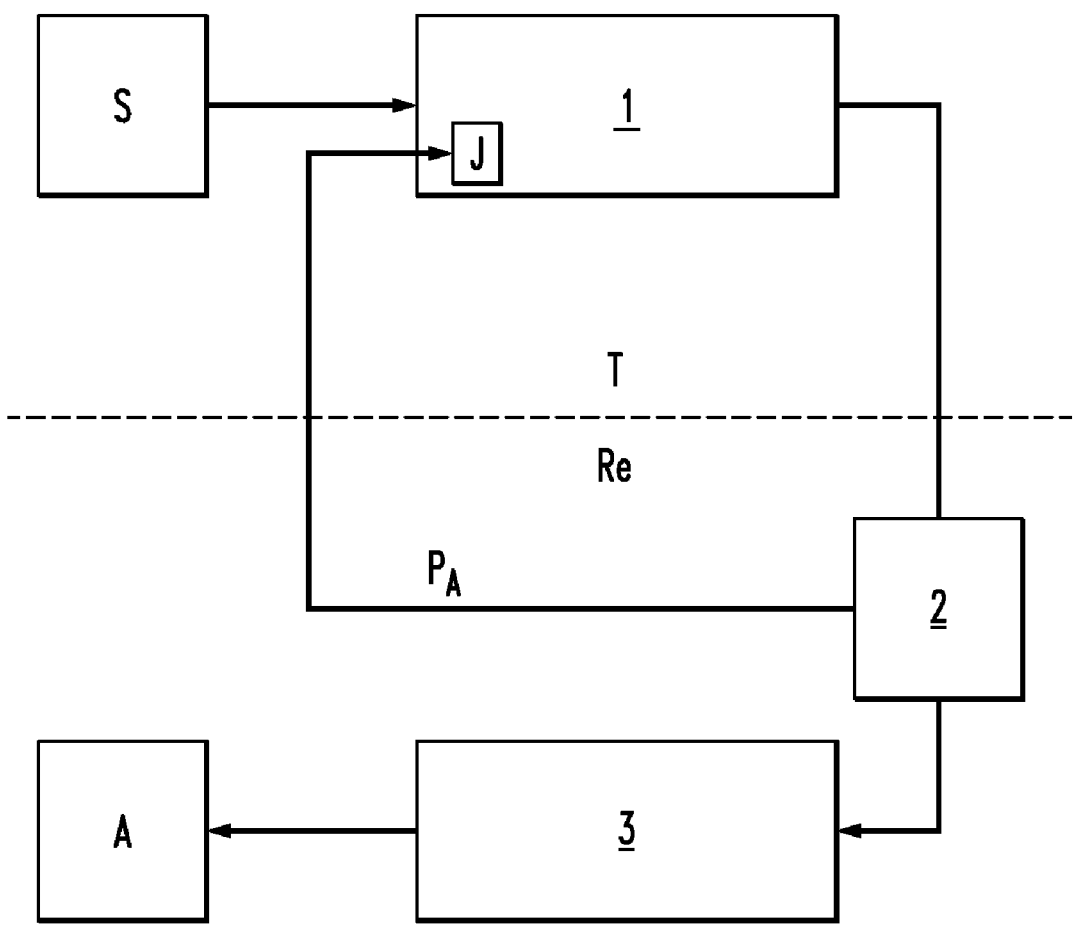

PROCESS FOR DELIVERING A VIDEO STREAM OVER A WIRELESS BIDIRECTIONAL CHANNEL BETWEEN A VIDEO ENCODER AND A VIDEO DECODER

FIELD OF INVENTION

The invention relates to a process for delivering a video stream over a wireless bidirectional channel between a video encoder and a video decoder, a video encoder, a video decoder and a radio decoder for implementing said process.

The invention applies in particular to video telephony, where two connected terminals are both transmitter and receiver.

Video stream transmission over a wireless channel consists in encoding a video stream, composed of many video frames, by a video encoder in order to be transmitted to a radio encoder. The video stream is then transmitted as a radio signal over a wireless channel to a radio decoder. The radio decoder changes the signal into bits to transmit it to a video decoder that rebuilds the video stream.

BACKGROUND

In a known manner video stream transmission over a wireless channel commonly uses inter frame prediction, also known as motion compensation. This method is used in all already deployed video compression systems and also for recent standards such as H.264 standard.

Video compression consists in predicting a block of a video frame (also called a macroblock in H.264) by translating an area of at least one reference frame using a motion vector. Many types of macroblocks exist. For example, intra predicted macroblock, called I macroblock, is predicted upon spatial neighboring macroblocks of the current frame, P macroblock uses a single motion vector associated to a reference area and B macroblock uses a bipredictive motion compensation scheme with two motion vectors associated to two reference areas.

Each decoded frame can be used for future prediction and video artifact propagation and expansion is due to the fact that frames are predicted upon previous decoded frames.

The problem is to optimize video delivery, and particularly to avoid inter frame video artifact propagation, in the case of low delay and low bandwidth wireless videophonie applications, considering the compression of the video stream over an unreliable bidirectional transmission channel.

The present invention is particularly well adapted to mobile video telephony applications, but can also be adapted to unicast video streaming. The scheme is not complex to implement (compared to ARQ schemes) and can reduce the problem of inter-frame artifact propagation which has a huge impact on perceptive video quality.

A common scheme for handling video artifact propagation is the periodic insertion of I macroblocks, as erroneous macroblocks from previous reference frames are not used in the prediction scheme. Inter frame artifact propagation is then stopped. This prediction method is not efficient in terms of compression. More often intra macroblocks are inserted, higher is the protection against inter frame artifact propagation, but lower is compression efficiency as Intra macroblock requires lots of bandwidth.

Erroneous macroblock detection can be done at receiver side by the radio decoder, which sends then a request to the encoder that will retransmit the requested part. This method may not be compatible with the low delay constraint required in video telephony applications. One key point is to keep video synchronized with real time audio (lip synchronization), thus limiting time allocated to Automatic Repeat request (ARQ) mechanisms and requiring extra bandwidth for retransmitted parts. When experiencing high bit error rate (BER), the retransmission bandwidth can be too large, the decoder may need to request retransmission more than one time.

In order to avoid using inter frame prediction upon an erroneous previous frame, another solution from the prior art is to select a reference image according to Acknowledgement/Non-Acknowledgement from the decoder as described in H.263 standard.

SUMMARY

The purpose of the invention is to resolve the problems of the prior art by proposing, in particular, a process for delivering a video stream over a wireless bidirectional channel between a video encoder and a video decoder using error probability estimations as additional cost factors in the motion estimation algorithm.

For that purpose and according to a first aspect, the invention relates to a process for delivering a video stream over a bidirectional wireless channel between a video encoder and a video decoder, wherein the video frames of the video stream are encoded by defining partitions of the video frames, said encoding being done by determining predictions for the partitions, a prediction being based on:
  at least one reference area of a reference frame of the video stream; said reference area being selected in order to minimize a cost function J;
  one motion vector associated to said reference area; and
  a weighting factor associated to said reference area;
wherein the difference between partition and corresponding predicted partition is done in order to establish a partition residual, the encoded video stream with partition residuals are transmitted to the video decoder in order to decode predicted partition of the video stream by using the reference area, the motion vector and weighting factor, decoded partition of the video frame being formed by combination of decoded predicted partition and corresponding partition residual; and wherein a transmission error probability of the decoded partition is fed back to the video encoder, said transmission error probability which is associated with the decoded partition of reference frame being used in the cost function of the motion estimation algorithm of the decoded partition as reference area.

According to a second aspect, the invention relates to video decoder, said video decoder comprising means to decode predicted partition of the video stream by using the reference area, the motion vector and weighting factor; means to form decoded partition of the video frame by combination of decoded predicted partition and corresponding partition residual; and means to feedback said transmission error probability to the video encoder.

According to a third aspect, the invention relates to a radio decoder destined to be connected with the video decoder, said radio decoder comprising means to compute transmission error probability upon radio decoding according to reliability criteria of the transmission of corresponding reference area.

According to a fourth aspect, the invention relates to a video encoder, said video encoder comprising means to encode video frames of the video stream by defining partitions of the video frames, said encoding being done by determining predictions for the partitions, a prediction being based on:

at least one reference area of a reference frame of the video stream; said reference area being selected in order to minimize a cost function J;
one motion vector associated to said reference area; and
a weighting factor associated to said reference area;
said video encoder comprising means to compute the cost function with the transmission error probability which is associated with the decoded partition as reference frame.

BACKGROUND OF THE FIGURES

FIG. 1 represents a simplified architecture of bidirectional wireless video stream transmission between a video encoder and a video decoder.

Other aspects and advantages will become apparent in the following description made with reference to the appended figure which represents a simplified architecture of bidirectional wireless video stream transmission between a video encoder and a video decoder. In video telephony applications, there are two connected terminals both transmitter T and receiver Re, but this is not represented in order to simplify the scheme.

DETAILED EMBODIMENTS

The process for delivering a video stream S over a wireless channel according to the invention proposes to encode video frames of the video stream S by defining partitions of the video frames by a video encoder 1.

In the described embodiment, the video encoding is achieved according to H.264 standard, notably according to H.264 AVC one and each partition is a P or a B macroblock as defined in the standard.

As P and B macroblocks use predictive motion compensation, the encoding is done by determining predictions M for the partitions, a prediction M being based on:
at least one reference area of a reference frame of the video stream; said reference area being selected in order to minimize a cost function J;
one motion vector associated to said reference area; and
a weighting factor associated to said reference area.

At this stage, the difference between partition and corresponding predicted partition is done in order to establish a partition residual.

The video encoder 1 forwards the encoded video stream with partition residuals to a radio encoder that transmits it then as a radio signal over a wireless channel to a radio decoder 2.

The encoded video stream with partition residuals are transmitted to the video decoder 3 in order to decode predicted partition M of the video stream by using the reference area, the motion vector and weighting factor, decoded partition A of the video frame being formed by combination of decoded predicted partition and corresponding partition residual.

Minimization of a cost function J is a common method for motion estimation. The cost function is generally based on a lagrangian multiplier to trade off between bit rate R needed to encode motion vectors and distortion D between predicted partition M and corresponding decoded partition A.

Integrating a transmission error probability $P_A$ of the decoded partition A in the cost function J allows ameliorating the motion estimation for the next transmission by decreasing or even stopping the inter frame error propagation.

To do so, the transmission error probability $P_A$ of the decoded partition A is computed upon radio decoding according to reliability criteria and coded on a fixed number of bits.

Reliability criteria can be determined from either:
log likelihood ratio from the radio decoder; or
bit error rate estimator; or
simple Cyclic Redundancy Check computation.

The transmission error probability $P_A$ can also be computed upon visual metrics on decoded predicted partition.

In more powerful and/or less constrained systems, such transmission error probability can be finer and/or be computed for each pixel or for each partition subpart rather than on each partition.

The transmission error probability $P_A$ is fed back by the video decoder 3 to the video encoder 1, said transmission error probability being used in the cost function J of the motion estimation algorithm of the decoded partition A as reference area. In such way, it is possible to select as reference area the decoded partition of reference frame that trades off between inter frame error propagation and compression efficiency.

The modified algorithm, integrating transmission error probability $P_A$ of the decoded partition A in the cost function is: $J=D(M-A, P_A)+\lambda R$, $\lambda$ being the lagrangian multiplier. The decoded partition A that minimizes the function J is selected as reference area by the motion estimation algorithm.

Hence, the motion estimation allows choosing less motion vectors referencing erroneous reference areas, thus attenuating inter frame errors propagation.

The probabilities are actually sent back to the encoder 1 within time of next frame encoding (in case of motion estimation is done on previous frame, leading to the best compression efficiency).

The invention claimed is:

1. Process for delivering a video stream over a bidirectional wireless channel between a video encoder and a video decoder, wherein the video frames of the video stream are encoded by defining partitions of the video frames, said encoding being done by determining predictions for the partitions, a prediction being based on:
at least one reference area of a reference frame of the video stream;
said reference area being selected in order to minimize a cost function J;
one motion vector associated to said reference area; and
a weighting factor associated to said reference area;
wherein the difference between partition and corresponding predicted partition is done by the video encoder in order to establish a partition residual, the encoded video stream with partition residuals are transmitted to the video decoder in order to decode predicted partition of the video stream by using the reference area, the motion vector and weighting factor, decoded partition of the video frame being formed by combination of decoded predicted partition and corresponding partition residual; and
wherein a transmission error probability of the decoded partition is fed back from the video decoder to the video encoder, said transmission error probability being used in the cost function of the motion estimation algorithm of the decoded partition (A) in conjunction with selecting the reference area for subsequent encoding of the video stream.

2. Process according to claim 1, wherein the video encoding is achieved according to H.264 standard, notably according to H.264 AVC one.

3. Process according to claim 2, wherein each partition is a P or a B macroblock as defined in the standard.

4. Process according to claim 1, wherein the transmission error probability is computed upon radio decoding of the transmission, said computing being done according to reliability criteria of the transmission of the decoded partition.

5. Process according to claim 4, wherein reliability criteria is determined from either:
   log likelihood ratio from the radio decoder; or
   bit error rate estimator; or
   simple Cyclic Redundancy Check computation.

6. Process according to claim 1 wherein the transmission error probability is computed upon visual metrics on decoded predicted partition.

7. The process set forth in claim 1 wherein use of the transmission error probability in cost function by the video encoder ameliorates motion estimation and decreases inter frame error propagation for subsequent encoding of the video stream.

8. The process set forth in claim 1 wherein use of the transmission error probability in cost function permits video encoder selection of the reference area associated with the decoded partition that minimizes cost function.

9. Video decoder for receiving a video stream generated by a video encoder over a bidirectional wireless channel, said video decoder comprising
   a decoder processor configured to decode predicted partition of a video stream by using a reference area of a reference frame of the video stream, a motion vector associated with the reference area, and a weighting factor associated with the reference area, where video frames of the video stream were encoded by the video encoder by defining partitions of the video frames and by determining predictions for the partitions based on the reference area, motion vector, and weighting factor, the reference area being selected by the video encoder in order to minimize a cost function of a motion estimation algorithm;
   wherein the decoder processor is also configured to form decoded partition of the video frame by combination of decoded predicted partition and corresponding partition residual, where a difference between partition and corresponding predicted partition was determined by the video encoder to establish the partition residual and the encoded video stream with partition residuals was forwarded to the video decoder by the video encoder; and
   a decoder output configured to feedback a transmission error probability of the decoded partition to the video encoder for use in the cost function (J) in conjunction with selecting the reference area for subsequent encoding of the video stream.

10. Video decoder according to claim 9, comprising a computing processor configured to compute the transmission error probability upon visual metrics on decoded predicted partition.

11. Video decoder according to claim 9 connected to a radio decoder, said radio decoder comprising a computing processor configured to compute the transmission error probability upon radio decoding according to reliability criteria of the transmission of decoded partition.

12. The video decoder set forth in claim 11 wherein the reliability criteria is based at least in part on a log likelihood ratio from the radio decoder, a bit error rate estimator, or a simple Cyclic Redundancy Check computation.

13. The video decoder set forth in claim 9 wherein use of the transmission error probability in cost function by the video encoder ameliorates motion estimation and decreases inter frame error propagation for subsequent encoding of the video stream.

14. The video decoder set forth in claim 9 wherein use of the transmission error probability in cost function permits video encoder selection of the reference area associated with the decoded partition that minimizes cost function.

15. Video encoder for forwarding a video stream to a video decoder over a bidirectional wireless channel, said video encoder comprising
   an encoding processor configured to encode video frames of a video stream by defining partitions of the video frames, said encoding being done by determining predictions for the partitions, a prediction being based on:
     at least one reference area of a reference frame of the video stream;
     said reference area being selected in order to minimize a cost function J;
     one motion vector associated to said reference area; and
     a weighting factor associated to said reference area;
   the encoding processor also configured to determine a difference between partition and corresponding predicted partition in order to establish a partition residual;
   an encoder output conofigured to forward the encoded video stream with partition residuals to the video decoder; and
   a computing processor configured to compute the cost function of the motion estimation algorithm using a transmission error probability fed back from the video decoder, wherein the transmission error probability is associated with a decoded partition formed by the video decoder by combination of decoded predicted partition and corresponding partition residual for a previous video frame of the video stream;
   wherein the encoding processor, in conjunction with the computing processor, uses the transmission error probability in conjunction with selecting the reference area for encoding at least the current video frame of the video stream.

16. The video encoder set forth in claim 15 wherein the transmission error probability is computed upon radio decoding of the transmission, the computing being done according to reliability criteria for transmission of the decoded partition.

17. The video encoder set forth in claim 16 wherein reliability criteria is based at least in part on a log likelihood ratio from the radio decoder, a bit error rate estimator, or a simple Cyclic Redundancy Check computation.

18. The video encoder set forth in claim 15 wherein the transmission error probability is computed upon visual metrics on decoded predicted partition.

19. The video encoder set forth in claim 15 wherein use of the transmission error probability in cost function ameliorates motion estimation and decreases inter frame error propagation for subsequent encoding of the video stream.

20. The video encoder set forth in claim 15 wherein use of the transmission error probability in cost function permits selection of the reference area associated with the decoded partition that minimizes cost function.

* * * * *